United States Patent
Mantell et al.

(10) Patent No.: US 11,518,083 B2
(45) Date of Patent: Dec. 6, 2022

(54) METHOD FOR MISSING EJECTOR COMPENSATION IN THREE-DIMENSIONAL OBJECT PRINTING

(71) Applicant: Xerox Corporation, Norwalk, CT (US)

(72) Inventors: David A. Mantell, Rochester, NY (US); Stuart A. Schweid, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 438 days.

(21) Appl. No.: 16/700,479

(22) Filed: Dec. 2, 2019

(65) Prior Publication Data

US 2020/0101714 A1 Apr. 2, 2020

Related U.S. Application Data

(62) Division of application No. 15/289,448, filed on Oct. 10, 2016, now Pat. No. 10,556,419.

(51) Int. Cl.
| | |
|---|---|
| *B29C 64/106* | (2017.01) |
| *B33Y 30/00* | (2015.01) |
| *B33Y 50/02* | (2015.01) |
| *B29C 64/20* | (2017.01) |
| *B29C 64/112* | (2017.01) |
| *B33Y 10/00* | (2015.01) |
| *B29C 64/386* | (2017.01) |

(52) U.S. Cl.
CPC .......... *B29C 64/106* (2017.08); *B29C 64/112* (2017.08); *B29C 64/20* (2017.08); *B33Y 30/00* (2014.12); *B33Y 50/02* (2014.12); *B29C 64/386* (2017.08); *B33Y 10/00* (2014.12)

(58) Field of Classification Search
CPC ..... B29C 64/106; B29C 64/112; B29C 64/20; B29C 64/386; B33Y 30/00; B33Y 50/02; B33Y 10/00
See application file for complete search history.

(56) References Cited

U.S. PATENT DOCUMENTS 6,565,180 B2 * 5/2003 Yu .......................... B41J 2/2142
347/14
7,693,595 B2 4/2010 Silverbrook
(Continued)

FOREIGN PATENT DOCUMENTS

WO 2004/024447 A2 3/2004

*Primary Examiner* — Nahida Sultana
(74) *Attorney, Agent, or Firm* — Maginot Moore & Beck LLP

(57) ABSTRACT

A method for operating a three-dimensional object printer compensates for inoperative ejectors. The method identifies image data values associated with an inoperative ejector that stored in a memory with other image data values for a three-dimensional object to be printed by the three-dimensional object printer. The method replaces the image data values associated with the inoperative ejector with image data values associated with an operative ejector that correspond to a material that is different than a material ejected by the inoperative ejector and operates a plurality of ejectors with reference to the other image data values and the replaced image data values to enable the operative ejector to eject drops of the material that is different than the material ejected by the inoperative ejector into the three-dimensional object at positions where the inoperative ejector would have ejected material.

20 Claims, 4 Drawing Sheets

(56) References Cited

U.S. PATENT DOCUMENTS

| | | |
|---|---|---|
| 8,042,899 B2 | 10/2011 | Folkins et al. |
| 8,376,503 B1 | 2/2013 | Wu et al. |
| 8,387,819 B2 | 3/2013 | Chu et al. |
| 8,531,743 B2 | 9/2013 | Wu et al. |
| 9,010,898 B2 | 4/2015 | Gerrits et al. |
| 9,186,887 B1 * | 11/2015 | Mantell ................ H04N 1/4015 |
| 9,227,424 B1 | 1/2016 | Mantell |
| 9,302,519 B1 * | 4/2016 | Clark .................... B41J 2/2142 |
| 2008/0118655 A1 | 5/2008 | Kritchman |
| 2012/0075370 A1 | 3/2012 | Ramakrishnan et al. |
| 2013/0265352 A1 | 10/2013 | Burress et al. |
| 2014/0035981 A1 * | 2/2014 | Burress ............... B41J 2/04581 347/14 |
| 2014/0139581 A1 | 5/2014 | Gerrits et al. |
| 2020/0130107 A1 * | 4/2020 | Mochizuki ......... B23K 26/0626 |
| 2020/0223222 A1 * | 7/2020 | Omori ................. B41J 2/04508 |
| 2020/0384777 A1 * | 12/2020 | Mishima ................. B41J 2/325 |
| 2021/0086502 A1 * | 3/2021 | Shindo .................. B41J 2/0451 |
| 2021/0339522 A1 * | 11/2021 | Shibata ............... B41J 2/04508 |

\* cited by examiner

METHOD FOR MISSING EJECTOR COMPENSATION IN THREE-DIMENSIONAL OBJECT PRINTING

PRIORITY CLAIM

This application is a divisional application claiming priority to U.S. patent application Ser. No. 15/289,448, which is entitled "System And Method For Missing Ejector Compensation In Three-Dimensional Object Printing" and which was filed on Oct. 10, 2016. That application issued as U.S. Pat. No. 10,556,419 on Feb. 11, 2020.

TECHNICAL FIELD

The system and method disclosed in this document relate to printers that produce three-dimensional objects and, more particularly, to compensating for inoperative ejectors in such printers.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. Three-dimensional printing is distinguishable from traditional object-forming techniques, which mostly rely on the removal of material from a work piece by a subtractive process, such as cutting or drilling.

The production of a three-dimensional object with these printers can require hours or, with some objects, even days. One issue that arises in the production of three-dimensional objects with a three-dimensional printer is consistent functionality of the ejectors in the printheads that eject the drops of material that form the objects. During printing of an object, one or more ejectors can deteriorate by ejecting the material at an angle, rather than normal, to the ejector, ejecting drops that are smaller than an ejector should eject, or by failing to eject any drop at all. An ejector suffering from any of these operational deficiencies is known as an inoperative or malfunctioning ejector. If the operational status of one or more ejectors deteriorates during object printing, the quality of the printed object cannot be assessed until the printing operation is completed. Consequently, print jobs requiring many hours or multiple days can produce objects that do not conform to specifications due to inoperative ejectors in the printheads. Once such objects are detected, the printed objects are scrapped, restorative procedures are applied to the printheads to restore ejector functionality, and the print job is repeated.

Systems that enable detection of inoperative ejectors while printing have been developed. A system that applies restorative procedures to compensate for inoperative ejectors during object printing would enable the continued production of a properly formed object. In this manner, product yield for the printer would be improved and its printing would be more efficient.

SUMMARY

A method that compensates for a malfunctioning ejector in a three-dimensional object printer includes identifying image data values associated with an inoperative ejector that are within a plurality of image data values stored in memory for a three-dimensional object to be printed by the three-dimensional object printer, replacing the image data values associated with the inoperative ejector with image data values associated with an operative ejector that ejects a material that is different than a material ejected by the inoperative ejector, and operating a plurality of ejectors with reference to the plurality of image data values and the replaced image data values to enable the operative ejector to eject drops of the material that is different than the material ejected by the inoperative ejector into the three-dimensional object at positions where the inoperative ejector would have ejected material.

A three-dimensional printer that implements the method for compensating for a malfunctioning ejector includes a platen, a memory that stores image data values corresponding to layers of a three-dimensional object to be printed by the three-dimensional object printer, a plurality of ejectors configured to eject drops of material towards the platen, and a controller operatively connected to the memory and the plurality of ejectors. The controller is configured to: identify image data values stored in the memory that are associated with an inoperative ejector, replace the image data values associated with the inoperative ejector that are stored in the memory with image data values associated with an operative ejector configured to eject drops of a material that is different than a material ejected by the inoperative ejector, and operate the ejectors with reference to the image data values and the replaced image data values stored in the memory to enable the operative ejector to eject drops of the material that is different than the material ejected by the inoperative ejector into the three-dimensional object at positions where the inoperative ejector would have ejected material.

BRIEF DESCRIPTION OF THE DRAWINGS

The foregoing aspects and other features of a system and method for compensating for a malfunctioning ejector in a three-dimensional object printer are explained in the following description, taken in connection with the accompanying drawings.

DETAILED DESCRIPTION

Figure 1:
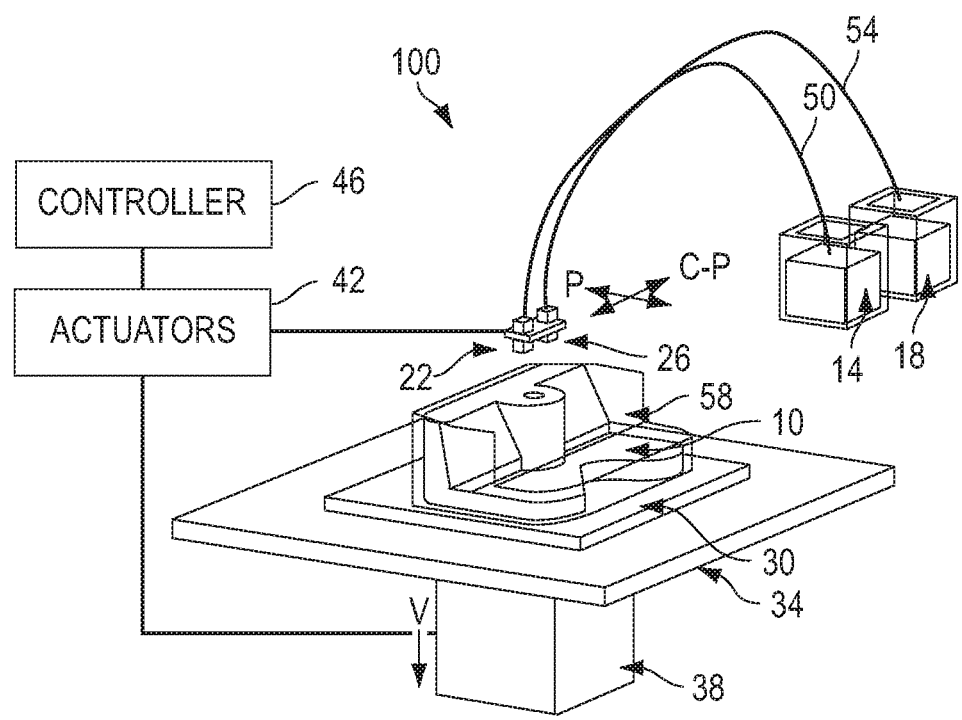
FIG. 1 is a perspective view of a three-dimensional object printer.

For a general understanding of the environment for the system and method disclosed herein as well as the details for the system and method, reference is made to the drawings. In the drawings, like reference numerals designate like elements.

FIG. 1 shows a configuration of components in a printing system 100, which produces a three-dimensional object or part 10. As used in this document, the term "three-dimensional printer" refers to any device that ejects material with reference to image data of an object to form a three-dimensional object. The printing system 100 includes a support material reservoir 14, a building material reservoir 18, a pair of ejector printheads 22, 26, a build substrate 30, a planar support member 34, a columnar support member 38, an actuator 42, and a controller 46. Conduit 50 connects printhead 22 to support material reservoir 14 and conduit 54 connects printhead 26 to building material reservoir 18. Both ejector printheads are operated by the controller 46 with reference to three-dimensional image data in a memory operatively connected to the controller to eject the support and building materials supplied to each respective printhead. Each datum stored in a single location in the three-dimensional image data is defined as a "voxel" in this document. The building material forms the structure of the part 10 being produced, while the support structure 58 formed by the support material enables the building material to maintain its shape while the material solidifies as the part is being constructed. After the part is finished, the support structure 58 is removed by washing, blowing, or melting.

The controller 46 is also operatively connected to at least one and possibly more actuators 42 to control movement of the planar support member 34, the columnar support member 38, and the printheads 22, 26 relative to one another. That is, one or more actuators can be operatively connected to structure supporting the printheads to move the printheads in a process direction and a cross-process direction with reference to the surface of the planar support member. Alternatively, one or more actuators can be operatively connected to the planar support member 34 to move the surface on which the part is being produced in the process and cross-process directions in the plane of the planar support member 34. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 1. The printheads 22, 26 and the columnar support member 38 also move in a direction that is orthogonal to the planar support member 34. This direction is called the vertical direction in this document, is parallel to the columnar support member 38, and is denoted with the letter "V" in FIG. 1. Movement in the vertical direction is achieved with one or more actuators operatively connected to the columnar member 38, by one or more actuators operatively connected to the printheads 22, 26, or by one or more actuators operatively connected to both the columnar support member 38 and the printheads 22, 26. These actuators in these various configurations are operatively connected to the controller 46, which operates the actuators to move the columnar member 38, the printheads 22, 26, or both in the vertical direction.

Figure 2A:
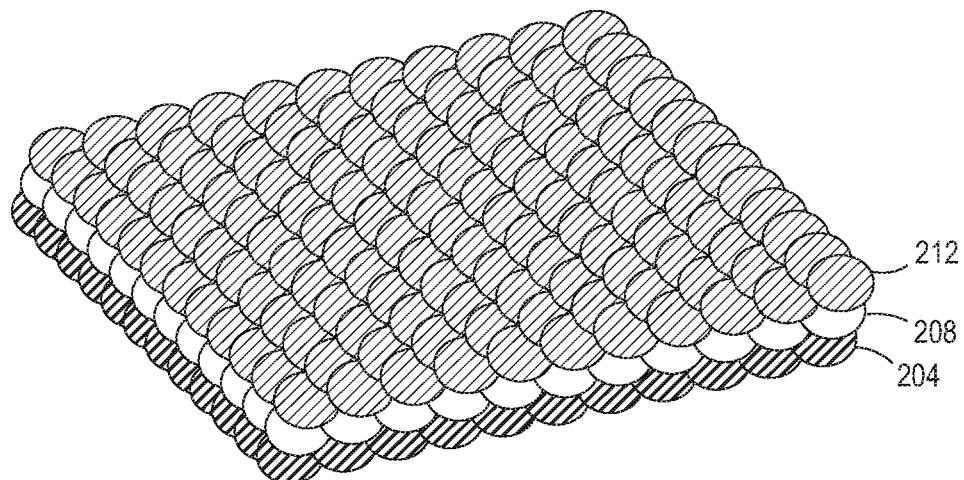
FIG. 2A depicts three layers of a printed object formed with drops of material ejected from operational ejectors.
Figure 2B:
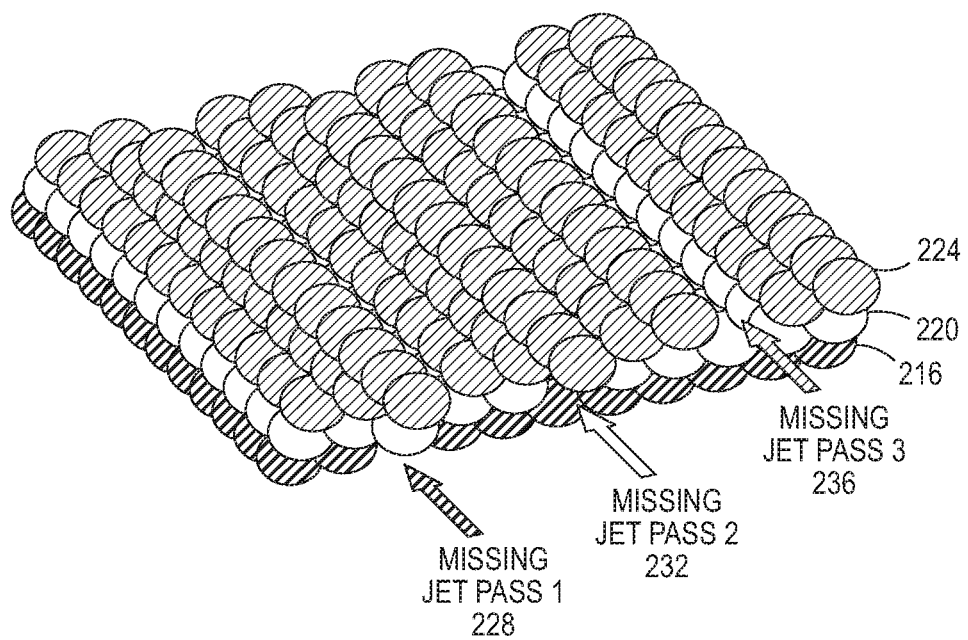
FIG. 2B depicts the three layers of FIG. 2A with the defects produced by an ejector failing to eject drops of material and being moved between layers to disperse the error in the layers.

FIG. 2A depicts three layers of a printed object. The three layers 204, 208, and 212 show each layer is composed of twelve drops of material by eleven drops of material. Although each layer is shown in single shade, the layers can be composed of drops of different materials and, although the layers are shown as individual drops, these drops combine to form a smooth layer. FIG. 2 illustrates the appearance of three layers of a printed object when every ejector contributing drops to the layer is fully operational. FIG. 2B depicts three layers of a printed object when an ejector becomes inoperative. In this illustration, only one ejector has become inoperative. The ejectors, however, are moved between layers so the inoperative ejector affects a different column in each layer 216, 220, and 224. As shown in the figure, row 228 in missing in layer 216, row 232 is missing in layer 220, and row 236 is missing in layer 224. Thus, the effect of the inoperative ejector is dispersed through the object.

Figure 3:
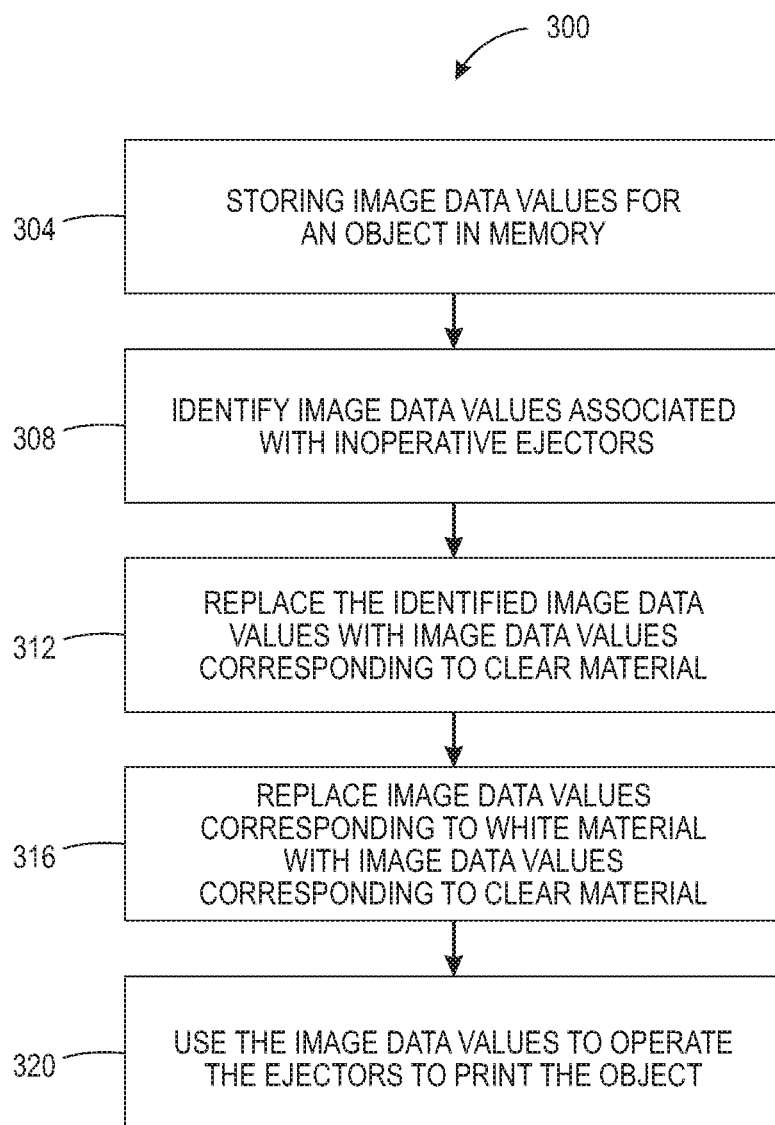
FIG. 3 is a flow diagram for a process for compensating for an inoperative ejector of colored material.

When an inoperative ejector is identified, the controller 46 begins restorative procedures to compensate for the inoperative ejector. Particularly, the controller 108 is configured to identify voxels to be printed in an object that are associated with the inoperative ejector and to modify the data used to operate the ejectors to compensate for the inoperative ejector. FIG. 3 depicts a process 300 for compensating for inoperative ejectors in a printhead of a three-dimensional object printer. In the description of this process, statements that the process is performing some task or function refers to a controller or general purpose processor executing programmed instructions stored in a memory operatively connected to the controller or processor to manipulate data or to operate one or more components in the printer to perform the task or function. The controller 46 noted above can be such a controller or processor. Alternatively, the controller 46 can be implemented with more than one processor and associated circuitry and components, each of which is configured to form one or more tasks or functions described herein.

The printer 100 can be configured in the manner noted above to perform to process 300 and is referenced by way of example. The process begins by storing image data for an object to be printed in a memory, which is operatively connected to the controller 46, and the image data are used to operate the ejectors to print the object (block 304). The image data can be continuous tone image data values or halftone image data values. As used in this document "continuous tone image data values" refer to multi-bit digital data values that represent a color intensity or amount of a material to be ejected into a voxel of the object corresponding to the image data value. "Halftone image data values," as used in this document, refer to single digital bit values that indicate whether a drop of a particular material is to be ejected into a voxel of the object corresponding to the image data value. Typically, continuous tone image data values are subjected to a vector halftoning process to produce halftone image data values using a single stochastic screen of thresholds. The halftone data are used to operate the ejectors to print the object. Thus, both continuous tone image data values and halftone image data values can be used to operate ejectors in a three-dimensional object printer.

Using known methods, inoperative ejectors are identified and the controller performing the process 300 uses the data identifying the inoperative ejectors to identify the image data values that correspond to inoperative ejectors in the image data values stored in the memory (block 308). These data values are then replaced with image data values associated with an operative ejector that ejects another type of material (block 312). In one embodiment, the other type of material is a clear material to enable the colors of previously ejected material to transmit towards the surface of the object and replace the color that would have been transmitted by the material that would have been ejected by the inoperative ejector. Thus, colored material that would have been ejected by the inoperative ejector is replaced by clear material. After the image data values associated with inoperative ejectors are replaced with image data values associated with operative ejectors that eject clear material, the process continues by replacing image data values associated with operative ejectors that eject white material with image data values associated with the operative ejector that ejects clear material (block 316). This image data replacement element also helps transmit color from lower layers to the surface to compensate for the loss of color occurring from the failure of the inoperative ejector to eject colored material. The image data values associated with the operative ejector that ejects white material are located within a volume that is centered about the image data value that was replaced for the inoperative ejector. For example, a three voxel by three voxel space can be centered about an image data value associated with an inoperative ejector that was replaced with an image data value associated with an ejector that ejects clear material. One or more image data values corresponding to white material can be replaced with image data values corresponding to clear material. Once the image data values associated with the operative ejector that ejects white material are replaced with image data values associated with the operative ejector that ejects clear material, the process uses the image data values originally stored in the memory and the image data values that replaced other image data values in the memory to operate the ejectors and print the layers of the object (block 320).

Figure 4A:
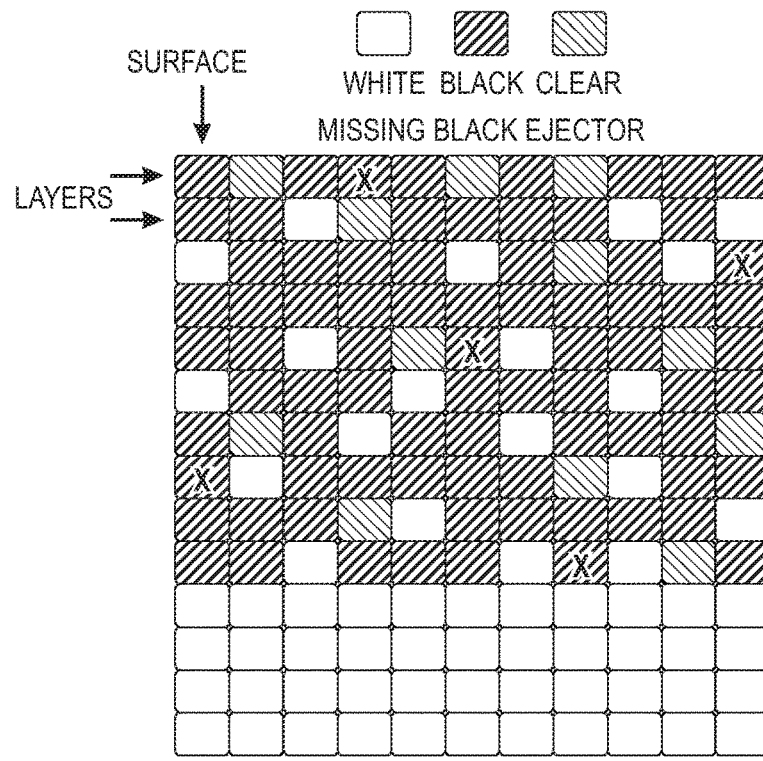
FIGS. 4A and 4B illustrate the operation of the method shown in FIG. 3.
Figure 4B:
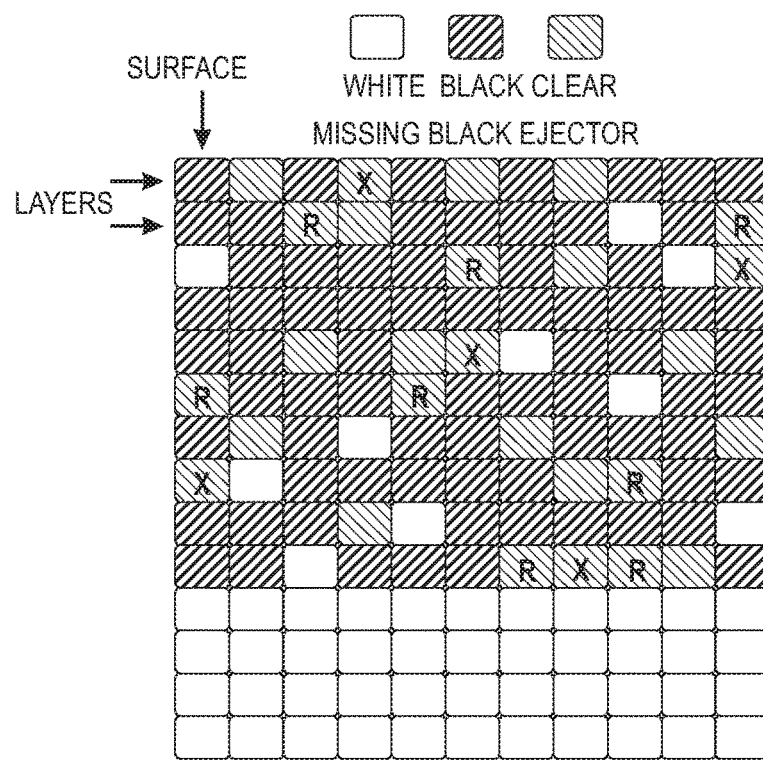

The operation of the process 300 is illustrated in FIG. 4A and FIG. 4B. The figures show a slice of a three-dimensional object in a side view that shows a plane of interior voxels as the image data would cause them to be printed. In the view of FIG. 4A, the solid black voxels marked with an "X" are those associated with an inoperative ejector and is moved as described above with regard to FIG. 2B to different locations in each layer to disburse the error caused by the inoperative ejector. As shown in FIG. 4B, these image data values have been replaced with image data values associated with an operative ejector that ejects clear material into the voxels that should have been printed by the inoperative ejector. In addition some of the image data values associated with an operative ejector that ejects drops of white material as shown in FIG. 4A have been replaced with image data values associated with the operative ejector that ejects drops of clear material. The replaced clear material image data values are identified with a "R." The reader should note that the replacements that occur in the neighborhood of an image data value associated with an inoperative ejector can occur at other positions in the volume centered about each image data associated with an inoperative ejector. That is, image data values in planes adjacent to the illustrated planes that are either in the plane of the figure or the plane external to the surface of the figure can be replaced as well. Also, while the example depicted in FIGS. 4A and 4B uses an inoperative black material ejector, the process of FIG. 3 can be used to compensate for inoperative ejectors that eject other colors of material.

As used in this document, "clear material" refers to material ejected by an ejector that is sufficiently transparent that it transmits light without altering the color of the transmitted light, although the clear material does not necessarily transmit all of the light. As used in this document, "colored material" refers to material ejected by an ejector that blocks the transmission of light and reflects a component of white light to impart a color to the reflected light. As used in this document, "white material" refers to material ejected by an ejector that blocks the transmission of light and reflects all components of white light so the reflected light appears white, although the white material does not necessarily reflect all of the light incident on the material. White material is typically used as a filler in the interior spaces of a printed object where color is not important. Clear material is printed to assist in the transmission of light into or out of an object and is typically printed near or at the surface of an object. Color materials are typically provided to impart colors to the object and enhance the appearance of the object.

In some situations, the placement and frequency of white voxels in the vicinity of a voxel associated with an inoperative ejector can result in the replacement of white voxels with clear voxels not sufficiently replacing the missing color arising from the loss of the drops from the inoperative ejector. In these situations, some of the white pixels that would otherwise be replaced with clear voxels are replaced with voxels having a color corresponding to the inoperative ejector. For example, in FIG. 4B, the first row containing colored voxels and most distal from the surface would have a black voxel rather than a clear voxel adjacent to the clear voxel replacing the voxel associated with the inoperative ejectors of black drops in that row. Additionally, the clear voxel three rows higher and three columns to the left would also be replaced with a black voxel to help restore the black color lost because of the inoperative ejector of black material.

Another important aspect in the replacement of voxels to compensate for missing colored voxels associated with an inoperative ejector is the consideration of ratios of colored material. For example, if voxels of yellow colored material are present in an area of an object in a 2:1 ratio with cyan colored voxels, then for every cyan colored voxel replaced with a clear voxel because an ejector of cyan material is inoperative, two yellow voxels are also replaced with clear voxels.

The above-described compensation scheme also is affected by voxels of a secondary or tertiary colors. These voxels contain drops of differently colored materials that produce another color. For example, blue voxels are formed with one or more drops of cyan material and one or more drops of magenta material. If an ejector of cyan material becomes inoperative, the blue voxels formed by cyan material from this ejector are also affected. In this situation, the replacement of white voxels with clear voxels can also be accompanied by the replacement of nearby voxels containing magenta material with white voxels. This additional replacement attenuates the effect of no diminishment of magenta material in voxels of an area in which voxels containing cyan material from the inoperative ejector have been replaced with white or clear voxels. Thus, the hue of the area is preserved.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A method of compensating for inoperative ejectors in a three-dimensional object printer comprising:
    identifying image data values associated with an inoperative ejector in a plurality of ejectors, the identified image data values are within a plurality of image data values stored in memory for a three-dimensional object to be printed by the three-dimensional object printer;
    replacing the image data values associated with the inoperative ejector with image data values associated with an operative ejector in the plurality of ejectors that ejects a material that is different than a material ejected by the inoperative ejector; and
    operating the plurality of ejectors using the plurality of image data values and the image data values that replaced the image data values associated with the inoperative ejector so the operative ejector ejects drops of the material that is different than the material ejected by the inoperative ejector into the three-dimensional object at positions where the image data values associated with the inoperative ejector would have operated the inoperative ejector to eject material.

2. The method of claim 1 further comprising:
moving the image data values associated with the inoperative ejector within a first layer by a first distance and moving the image data values associated with the inoperative ejector in a second layer by a second distance that is different than the first distance to attenuate an effect of the inoperative ejector on the first and the second layers.

3. The method of claim 2 wherein the first layer is adjacent to the second layer.

4. The method of claim 2 wherein the movement of the image data values associated with the inoperative ejector in the first and the second layers occurs before the image data values associated with the inoperative ejector are replaced with the image data values associated with the operative ejector.

5. The method of claim 4 wherein the image data values associated with the inoperative ejector correspond to a colored material and the image data values associated with the operative ejector correspond to a clear material.

6. The method of claim 5 further comprising:
identifying image data values associated with other operative ejectors that correspond to material that is different than the colored material and different than the clear material, the identified image data values being located within predetermined volumes about the identified image data values associated with the inoperative ejector; and
replacing the identified image data values associated with the other operative ejectors with image data values associated with the operative ejector that correspond to clear material.

7. The method of claim 6 further comprising:
identifying a ratio between the identified image data values associated with the other operative ejectors that are located within the predetermined volumes and the identified image data values associated with the inoperative ejector; and
using the identified ratio to replace the identified image data values associated with the other operative ejectors that are located within the predetermined volumes.

8. The method of claim 6, the identification of the image data values associated with the other operative ejectors further comprising:
identifying only the image data values associated with the other operative ejectors that correspond to white material.

9. The method of claim 6 further comprising:
replacing the identified image data values associated with one of the other operative ejectors that correspond to white material with image data values associated with the operative ejector that correspond to the clear material.

10. The method of claim 9 further comprising:
identifying image data values associated with other operative ejectors that eject a material that is different than the white material and different than the clear material, the identified image data values being located within predetermined volumes about the image data values identified with the inoperative ejector; and
replacing the identified image data values associated with the other ejectors with image data values associated with the operative ejector that corresponds to the clear material.

11. The method of claim 1, the identification and replacement of the image data values further comprising:
identifying continuous tone image data values associated with the inoperative ejector; and
replacing the continuous tone image data values associated with the inoperative ejector with continuous tone image data values associated with the operative ejector that correspond to the clear material.

12. The method of claim 1, the identification and replacement of the image data values further comprising:
identifying halftone image data values associated with the inoperative ejector; and
replacing the halftone tone image data values associated with the inoperative ejector with halftone image data values associated with the operative ejector that correspond to the clear material.

13. The method of claim 1 further comprising:
identifying image data values associated with a color formed with at least two differently colored materials, the image data values associated with one of the at least two differently colored materials are also associated with the inoperative ejector; and
replacing the identified image data values associated with the other one of the at least two differently colored materials with image data values associated with an operative ejector that corresponds to white material.

14. A method of compensating for inoperative ejectors in a three-dimensional object printer comprising:
identifying image data values associated with an inoperative ejector in a plurality of ejectors, the identified image data values are within a plurality of image data values stored in memory for a three-dimensional object to be printed by the three-dimensional object printer;
moving the image data values associated with the inoperative ejector within a first layer by a first distance and moving the image data values associated with the inoperative ejector in a second layer by a second distance that is different than the first distance to attenuate an effect of the inoperative ejector on the first and the second layers;
replacing the image data values associated with the inoperative ejector with image data values associated with an operative ejector in the plurality of ejectors that ejects a material that is different than a material ejected by the inoperative ejector after the image data values associated with the inoperative ejector in the first and the second layers have been moved; and
operating the plurality of ejectors using the plurality of image data values and the image data values that replaced the image data values associated with the inoperative ejector so the operative ejector ejects drops of the material that is different than the material ejected by the inoperative ejector into the three-dimensional object at positions where the image data values associated with the inoperative ejector would have operated the inoperative ejector to eject material.

15. The method of claim 2 wherein the first layer is adjacent to the second layer.

16. The method of claim 14 wherein the image data values associated with the inoperative ejector correspond to a colored material and the image data values associated with the operative ejector correspond to a clear material.

17. The method of claim 16 further comprising:
identifying image data values associated with other operative ejectors that correspond to material that is different than the colored material and different than the clear material, the identified image data values being located within predetermined volumes about the identified image data values associated with the inoperative ejector; and
replacing the identified image data values associated with the other operative ejectors with image data values associated with the operative ejector that correspond to clear material.

18. The method of claim 17 further comprising:
identifying a ratio between the identified image data values associated with the other operative ejectors that are located within the predetermined volumes and the identified image data values associated with the inoperative ejector; and
using the identified ratio to replace the identified image data values associated with the other operative ejectors that are located within the predetermined volumes.

19. The method of claim 17, the identification of the image data values associated with the other operative ejectors further comprising:
identifying only the image data values associated with the other operative ejectors that correspond to white material.

20. The method of claim 17 further comprising:
replacing the identified image data values associated with one of the other operative ejectors that correspond to white material with image data values associated with the operative ejector that correspond to the clear material.

* * * * *